United States Patent
Badre-Alam et al.

(10) Patent No.: US 8,272,592 B2
(45) Date of Patent: *Sep. 25, 2012

(54) METHOD AND SYSTEM FOR CONTROLLING HELICOPTER VIBRATIONS

(75) Inventors: Askari Badre-Alam, Apex, NC (US);
Douglas Swanson, Cary, NC (US);
Jeffrey Cranmer, Holly Springs, NC (US)

(73) Assignee: Lord Corporation, Cary, NC (US)

( * ) Notice: Subject to any disclaimer, the term of this patent is extended or adjusted under 35 U.S.C. 154(b) by 342 days.

This patent is subject to a terminal disclaimer.

(21) Appl. No.: 12/640,149

(22) Filed: Dec. 17, 2009

(65) Prior Publication Data

US 2010/0090054 A1    Apr. 15, 2010

Related U.S. Application Data

(63) Continuation of application No. 11/942,381, filed on Nov. 19, 2007, now Pat. No. 7,686,246, which is a continuation of application No. 11/149,514, filed on Jun. 10, 2005, now Pat. No. 7,370,829.

(60) Provisional application No. 60/578,645, filed on Jun. 10, 2004.

(51) Int. Cl.
*B64C 11/00* (2006.01)

(52) U.S. Cl. .................. 244/17.13; 244/17.27

(58) Field of Classification Search .............. 244/17.11, 244/17.13, 17.27; 381/71.1; 416/500; 180/300, 180/312; 248/550

See application file for complete search history.

(56) References Cited

U.S. PATENT DOCUMENTS

| | | | |
|---|---|---|---|
| 4,479,098 A | 10/1984 | Watson et al. | |
| 4,483,425 A | 11/1984 | Newman | |
| 4,808,955 A | 2/1989 | Godkin et al. | |
| 4,819,182 A | 4/1989 | King et al. | |
| 4,922,159 A | 5/1990 | Phillips et al. | |
| 5,219,037 A | 6/1993 | Smith et al. | |
| 5,231,336 A | 7/1993 | van Namen | |
| 5,278,913 A | 1/1994 | Delfosse et al. | |
| 5,332,061 A | 7/1994 | Majeed et al. | |
| 5,345,206 A | 9/1994 | Morcos | |
| 5,427,362 A | 6/1995 | Schilling et al. | |

(Continued)

FOREIGN PATENT DOCUMENTS

WO    00/49309    8/2000

OTHER PUBLICATIONS

Hutchinson, Paulstra-Vibrachoc-Stopchoc 2005, pp. 1-17.

(Continued)

*Primary Examiner* — Timothy D Collins
*Assistant Examiner* — Jamie S Stehle
(74) *Attorney, Agent, or Firm* — Richard G. Miller

(57) ABSTRACT

A method/system for controlling helicopter vibrations is provided that includes a vibration canceling force generator for actively generating a vibration canceling force. The system includes a resonant actuator having a natural resonant frequency and a resonant actuator electronic control system. The resonant actuator electronic control system provides an electrical drive current to the resonant actuator to drive the resonant actuator about the resonant frequency when commanded by a received command signal. The resonant actuator has a feedback output with the feedback output fed back into the resonant actuator electronic control system wherein the resonant actuator electronic control system adjusts the electrical drive current based on the resonant actuator feedback output to generate the vibration canceling force.

33 Claims, 15 Drawing Sheets

U.S. PATENT DOCUMENTS

| | | | |
|---|---|---|---|
| 5,526,292 | A | 6/1996 | Hodgson et al. |
| 5,620,068 | A | 4/1997 | Garnjost et al. |
| 5,682,069 | A | 10/1997 | Phillips et al. |
| 5,710,822 | A | 1/1998 | Steenhagen et al. |
| 5,853,144 | A | 12/1998 | Vincent |
| 5,883,447 | A | 3/1999 | Clausin |
| 5,883,478 | A | 3/1999 | Thesling |
| 5,896,076 | A | 4/1999 | van Namen |
| 5,920,173 | A | 7/1999 | Mercadal et al. |
| 5,954,169 | A | 9/1999 | Jensen |
| 6,006,875 | A | 12/1999 | van Namen |
| 6,009,985 | A | 1/2000 | Ivers |
| 6,045,090 | A | 4/2000 | Krysinsky et al. |
| 6,059,274 | A | 5/2000 | Owen et al. |
| 6,067,853 | A | 5/2000 | Thevenot |
| 6,094,601 | A | 7/2000 | Popovich |
| 6,216,047 | B1 | 4/2001 | Goto |
| 6,279,704 | B1 | 8/2001 | Manfredotti |
| 6,355,994 | B1 | 3/2002 | Andeen et al. |
| 6,418,228 | B1 | 7/2002 | Terai et al. |
| 6,467,723 | B1 | 10/2002 | Rossetti et al. |
| 6,512,435 | B2 | 1/2003 | van Namen |
| 6,639,496 | B1 | 10/2003 | van Namen |
| 7,288,861 | B1 | 10/2007 | Willard et al. |
| 7,370,829 | B2 | 5/2008 | Badre-Alam et al. |
| 7,550,880 | B1 | 6/2009 | Pusl |

OTHER PUBLICATIONS

Motran Industries Inc., Electromagnetic Linear Actuators for Active Vibration Control. Jul. 28, 2003, pp. 1-2.
Ryota Okawa et al., Modal Analysis of HDDs Actuators, Fujikura Technical review, 2002, pp. 7-12.
Adaptronics, Inc., Glossary of Common Terms, Sep. 24, 2003, pp. 1-3.
Adaptronics, Inc., Piezolectric Actuators, Sep. 24, 2003, pp. 1-2.
Motran Industries Inc., Inertial Actuator, Jul. 28, 2003, pp. 1-2.
C.Y. Chen, et al., Passive Voice Coil Feedback Control of Closed-Box Subwoofer System, Proc. Instn Mech Engrs, vol. 214, part C, 2000, pp. 995-1005.
Motran Industries Inc., The Intertial Force Transducer, Jul. 28, 2003, pp. 1-4.
Motran Industries Inc., The Axial Force Transducer, Jul. 28, 2003, pp. 1-3.
Motran Indusctries Inc., Inertial Force Actuators, Jun. 16, 2000, pp. 1-2.
Vibration & Waves, Damped Harmonic Motion, General Solution, Feb. 17, 2004, pp. 1-2.
Vibration & Waves, Damped Harmonic Motion, Heavy Damping, Feb. 17, 2004, pp. 1-2.
Vibration & Waves, Damped Harmonic Motion, Critical Damping, Feb. 17, 2004, pp. 1-2.
Motion Control Solutions, Voice Coil Actuators, 1998, p. 1.
Motran Industries Inc., Axial Force Transducer, Jul. 28, 2003, pp. 1-2.
Anthony C. Morcos, Voice Coil Actuators for Use in Motion Control Systems, Motion Magazine, Fall 1998, pp. 1-5.
BEI Technologies, Inc., VCA 100 Standalone Voice Coil Servo Controller/Amplifier, Sep. 19, 2003, pp. 1-2.
BEI Technologies, Inc., Compact Bi-Directional Linear Actuator Offers Solutions for Hysteresis-Free Operating Requirements, Sep. 19, 2003, pp. 1-2.
BEI Technologies, Inc., Worlds Largest and Most Powerful Voice Coil Actuator, Jan. 2003, p. 1.
BEI Technologies, Inc., Abbreviated Specifications for VCA100 Stand-Alone Voice Coil Servo., 1998, p. 1.

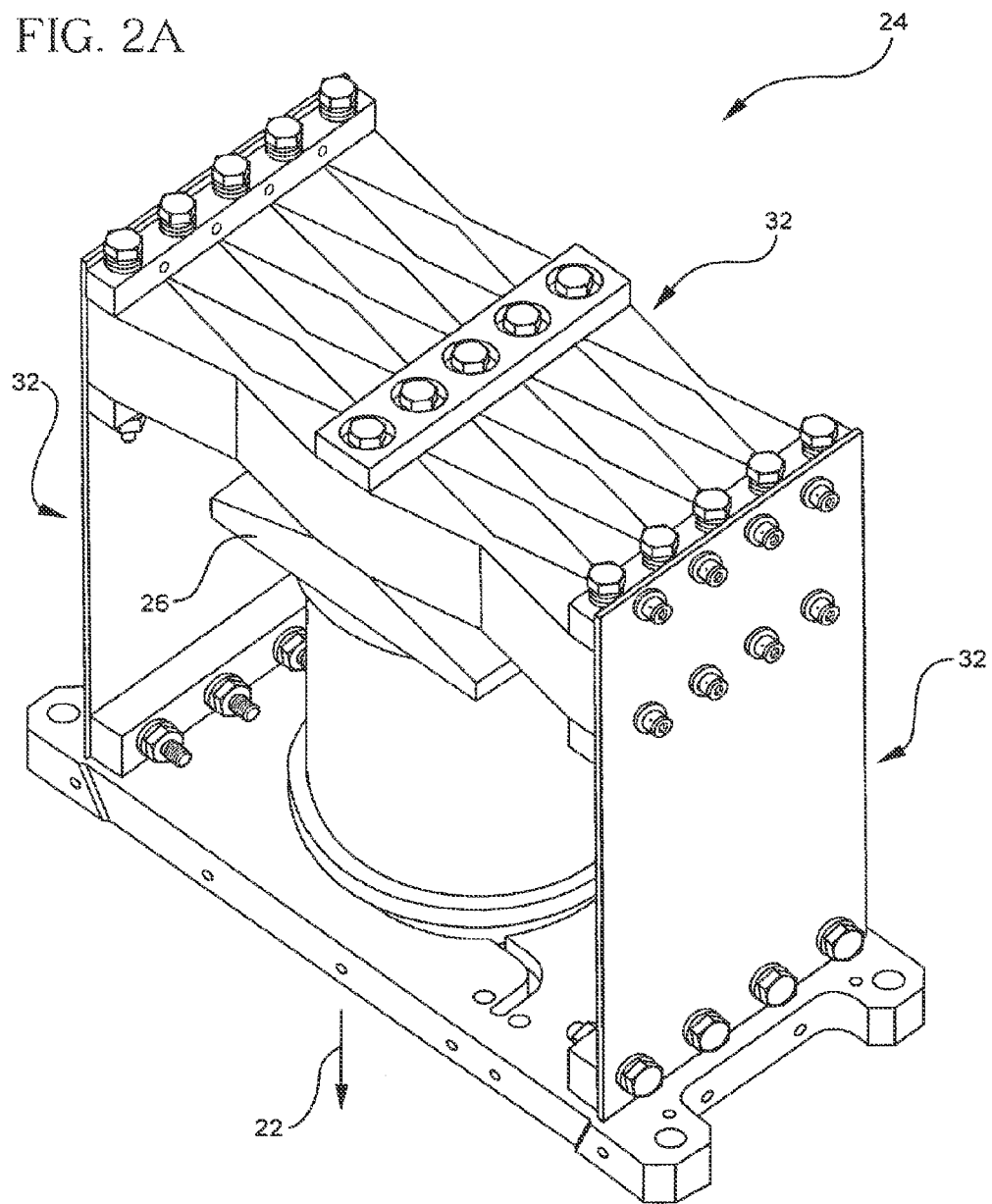

METHOD AND SYSTEM FOR CONTROLLING HELICOPTER VIBRATIONS

CROSS REFERENCE

This application is a continuation of U.S. patent application Ser. No. 11/942,381, filed Nov. 19, 2007 now U.S. Pat. No. 7,686,246, which is a continuation of U.S. patent application Ser. No. 11/149,514 filed Jun. 10, 2005, now U.S. Pat. No. 7,370,829, which claims the benefit of, and incorporates by reference, Provisional Patent Application No. 60/578,645 filed on Jun. 10, 2004, all of which the benefit is hereby claimed and incorporated by reference.

FIELD OF THE INVENTION

The present invention relates to a method/system for controlling problematic vibrations. More particularly the invention relates to a method and system for controlling aircraft vehicle vibrations, particularly a method and system for canceling problematic rotary wing helicopter vibrations.

BACKGROUND OF THE INVENTION

Helicopter vibrations are particularly troublesome in that they can cause fatigue and wear on the equipment and occupants in the aircraft. In vehicles such as helicopters, vibrations are particularly problematic in that they can damage the actual structure and components that make up the vehicle in addition to the contents of the vehicle.

There is a need for a system and method of accurately and economically canceling vehicle vibrations. There is a need for a system and method of accurately and economically controlling vibrations. There is a need for an economically feasible method of controlling vibrations in a helicopter so that the vibrations are efficiently cancelled and minimized. There is a need for a robust system of controlling vibrations in a helicopter so that the vibrations are efficiently cancelled and minimized. There is a need for an economic method/system for controlling problematic helicopter vibrations.

SUMMARY OF THE INVENTION

The invention includes a vibration canceling force generator for actively generating a vibration canceling force. The vibration canceling force generator includes a resonant actuator having a natural resonant frequency, and a resonant actuator electronic control system having a command input for receiving a command signal with the resonant actuator electronic control system providing an electrical drive current to the resonant actuator to drive the resonant actuator about the resonant frequency when commanded by a received command signal, and the resonant actuator has a feedback output with the feedback output fed back into the resonant actuator electronic control system wherein the resonant actuator electronic control system adjusts the electrical drive current based on the resonant actuator feedback output to generate the vibration canceling force.

The invention includes a method of making a vibration canceling force generator. The method includes providing a resonant actuator having a natural resonant frequency, providing a resonant actuator electronic control system having a command input for receiving a command signal and a power amplifier for providing an electrical drive current to drive the resonant actuator, and connecting the resonant actuator with the resonant actuator electronic control system wherein the resonant actuator electronic control system electrical drive current drives the resonant actuator about the natural resonant frequency when commanded by a received command signal, with the resonant actuator feeding an electrical output back into the resonant actuator electronic control system wherein the resonant actuator electronic control system adjusts the electrical drive current based on the resonant actuator electrical output.

The invention includes a method of controlling vibrations. The method includes providing a resonant actuator having a natural resonant frequency, providing a resonant actuator electronic control system for providing an electrical drive current to drive the resonant actuator, connecting the resonant actuator with the resonant actuator electronic control system, and driving the resonant actuator about the natural resonant frequency with the resonant actuator feeding an electrical output back into the resonant actuator electronic control system and adjusting the electrical drive current based on the resonant actuator electrical output.

The invention includes a vehicle vibration canceling system. The vehicle vibration canceling system includes a resonant actuator having a natural resonant frequency. The vehicle vibration canceling system includes a resonant actuator electronic controller for providing an electrical drive current to the resonant actuator to drive the resonant actuator about the resonant frequency. The resonant actuator has a feedback electrical output with the feedback electrical output fed back into the resonant actuator electronic controller wherein said resonant actuator electronic controller adjusts said electrical drive current based on said resonant actuator feedback electrical output.

The invention includes a method of making a helicopter vibration canceling system. The method includes providing a resonant actuator having a natural resonant frequency. The method includes providing a resonant actuator electronic control system for providing an electrical drive current to drive said resonant actuator. The method includes connecting the resonant actuator with the resonant actuator electronic control system wherein the resonant actuator electronic control system electrical drive current drives the resonant actuator about the natural resonant frequency with said resonant actuator feeding an electrical output back into the resonant actuator electronic control system wherein the resonant actuator electronic control system adjusts the electrical drive current based on the resonant actuator electrical output.

The invention includes a method of controlling helicopter vibrations. The method includes providing a resonant actuator having a natural resonant frequency. The method includes mounting the resonant actuator in a helicopter. The method includes providing a resonant actuator electronic control system for providing an electrical drive current to drive the resonant actuator. The method includes connecting the resonant actuator with the resonant actuator electronic control system. The method includes driving the resonant actuator about the natural resonant frequency with the resonant actuator feeding an electrical output back into the resonant actuator electronic control system and adjusting the electrical drive current based on the resonant actuator electrical output.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

BRIEF DESCRIPTION OF THE DRAWINGS

FIG. 2A-D show resonant actuators for controlling vibrations.

DETAILED DESCRIPTION OF THE PREFERRED EMBODIMENTS

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

The invention comprises a vibration canceling force generator for actively generating a vibration canceling force. The vibration canceling force generator includes a resonant actuator having a natural resonant frequency, and a resonant actuator electronic control system with the resonant actuator electronic control system providing an electrical drive current to the resonant actuator to drive the resonant actuator about the resonant frequency when commanded. The resonant actuator has a feedback output with the feedback output fed back into the resonant actuator electronic control system wherein the resonant actuator electronic control system adjusts the electrical drive current based on the resonant actuator feedback output to generate the vibration canceling force.

Figure 1:
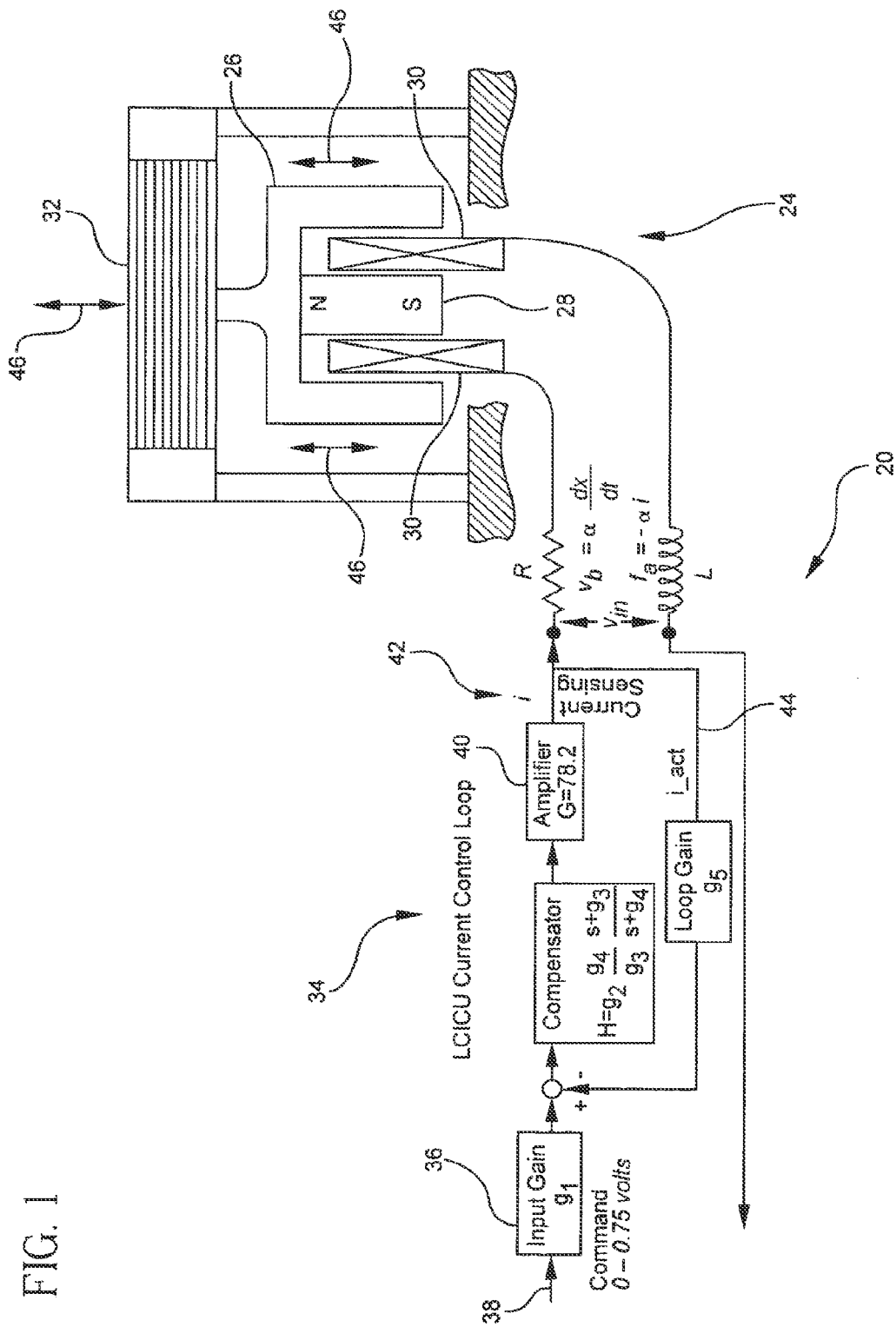
FIG. 1 shows methods and systems for controlling vibrations.
Figure 2B:
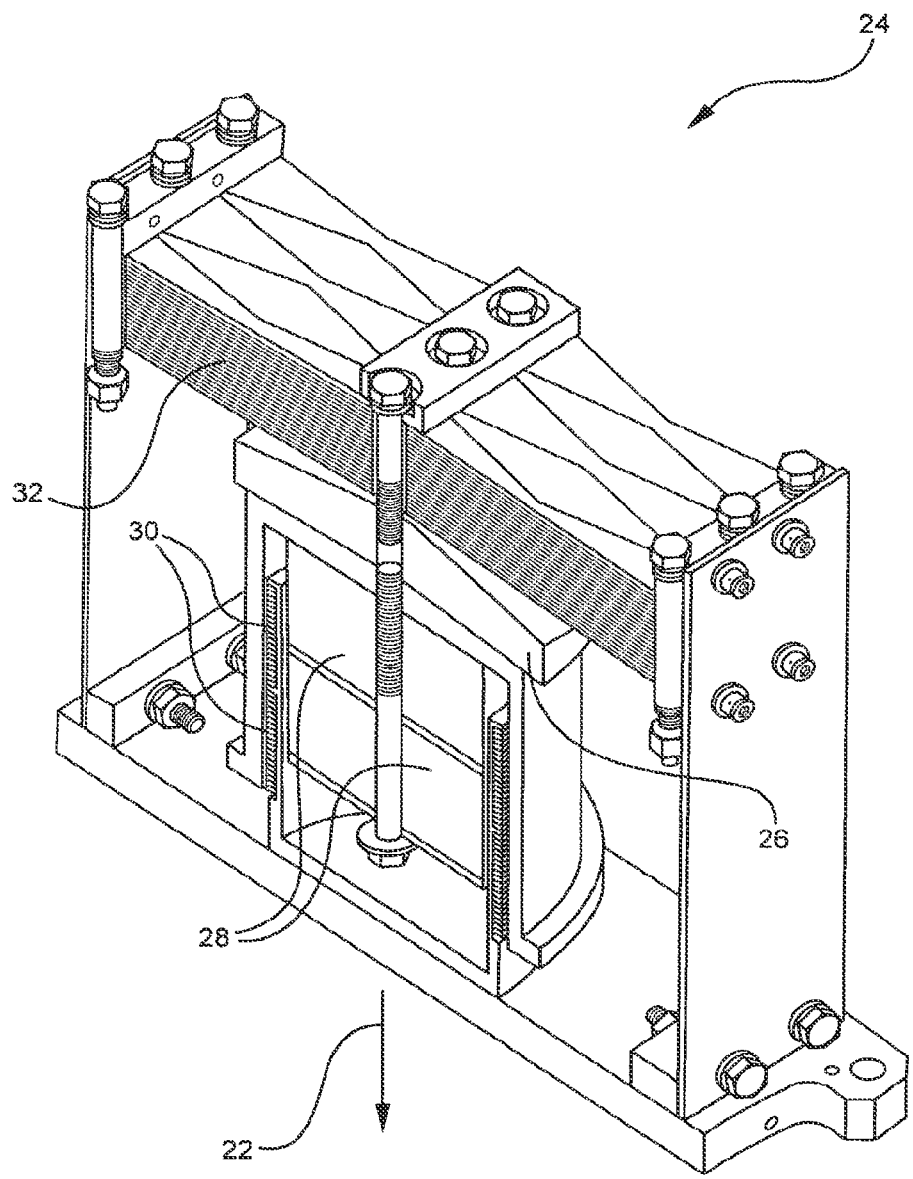
Figure 2C:
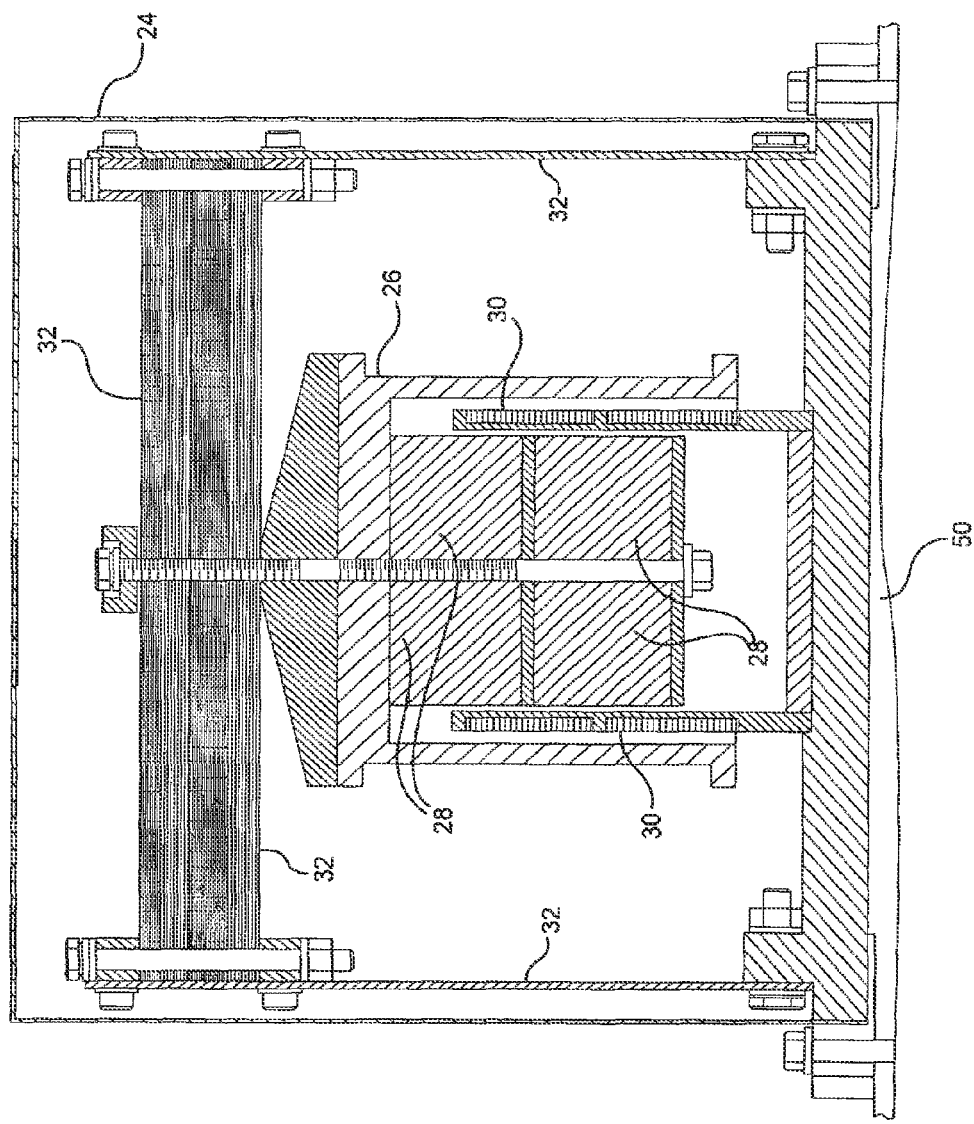
Figure 2D:
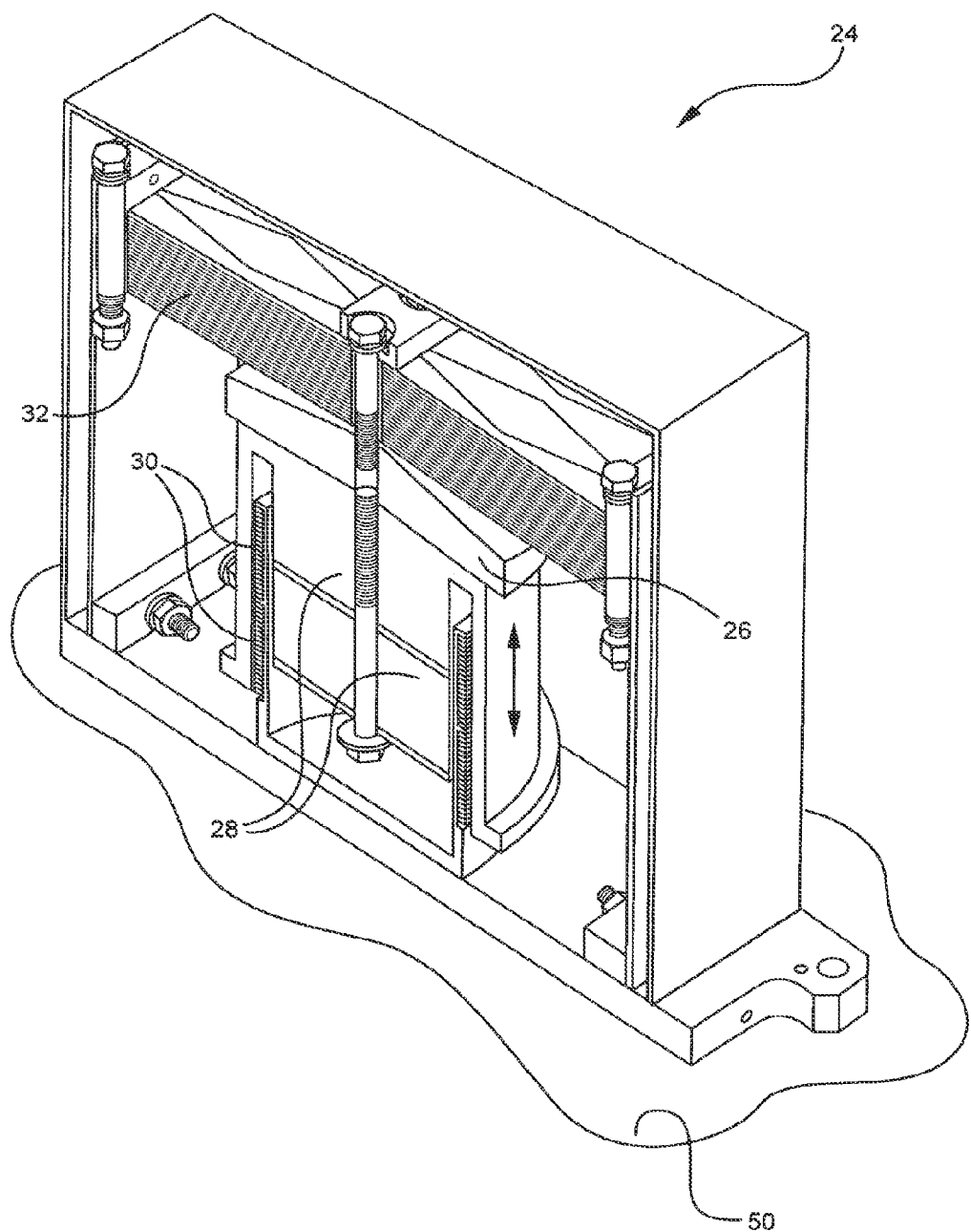
Figure 3:
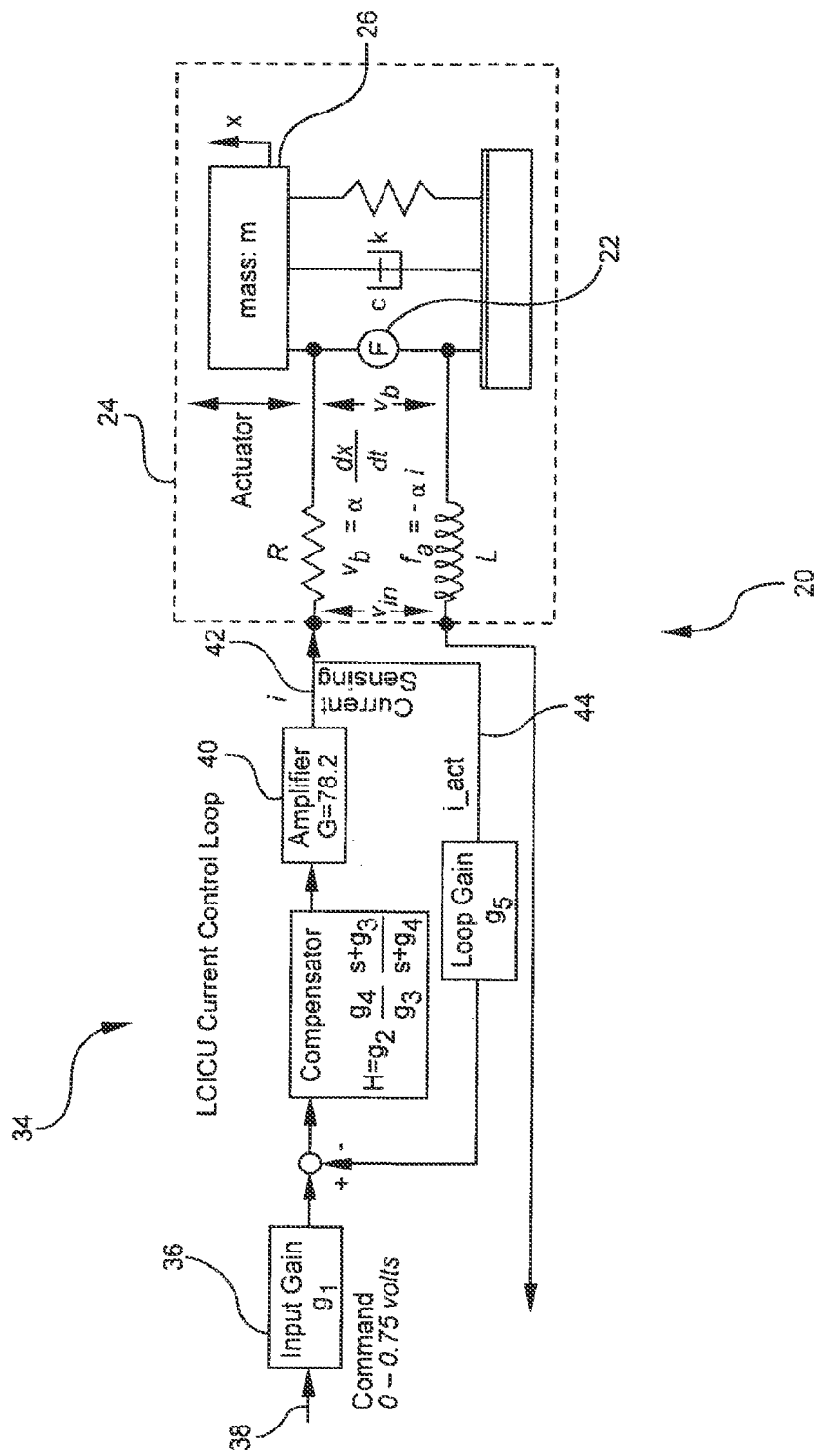
FIG. 3 shows methods and systems for controlling vibrations.
Figure 4A:
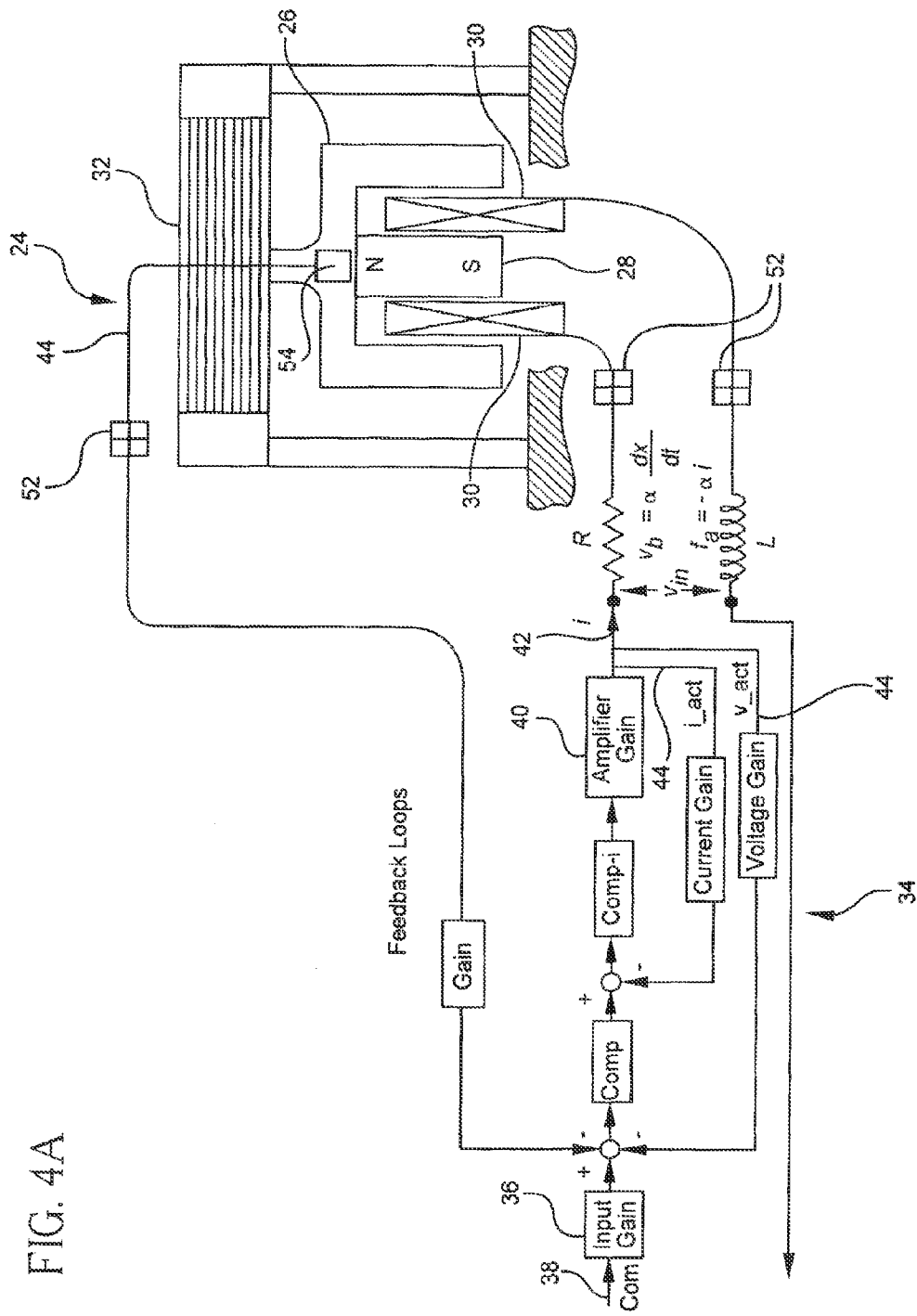
FIG. 4A-B show methods and systems for controlling vibrations.
Figure 4B:
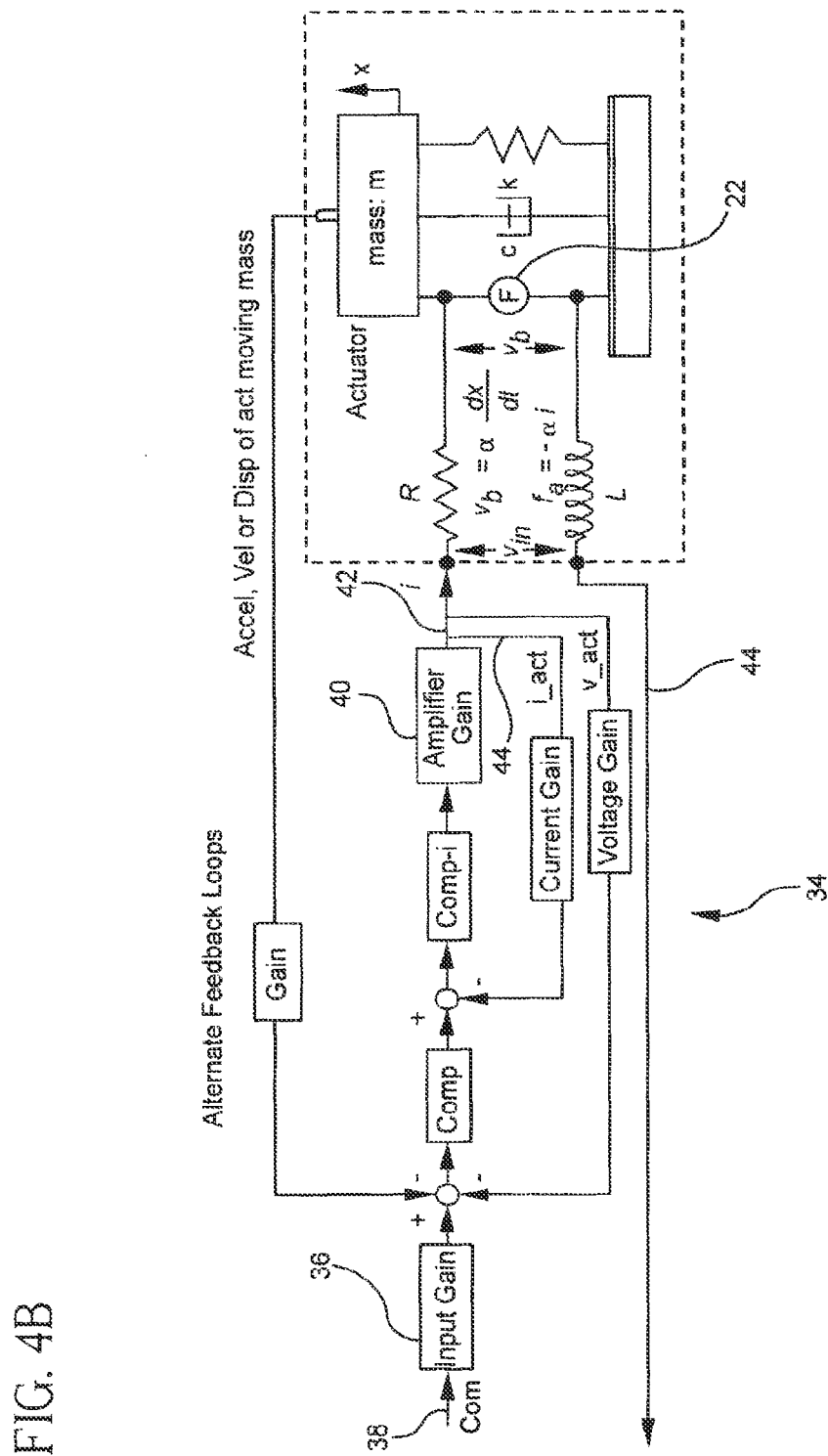
Figure 5:
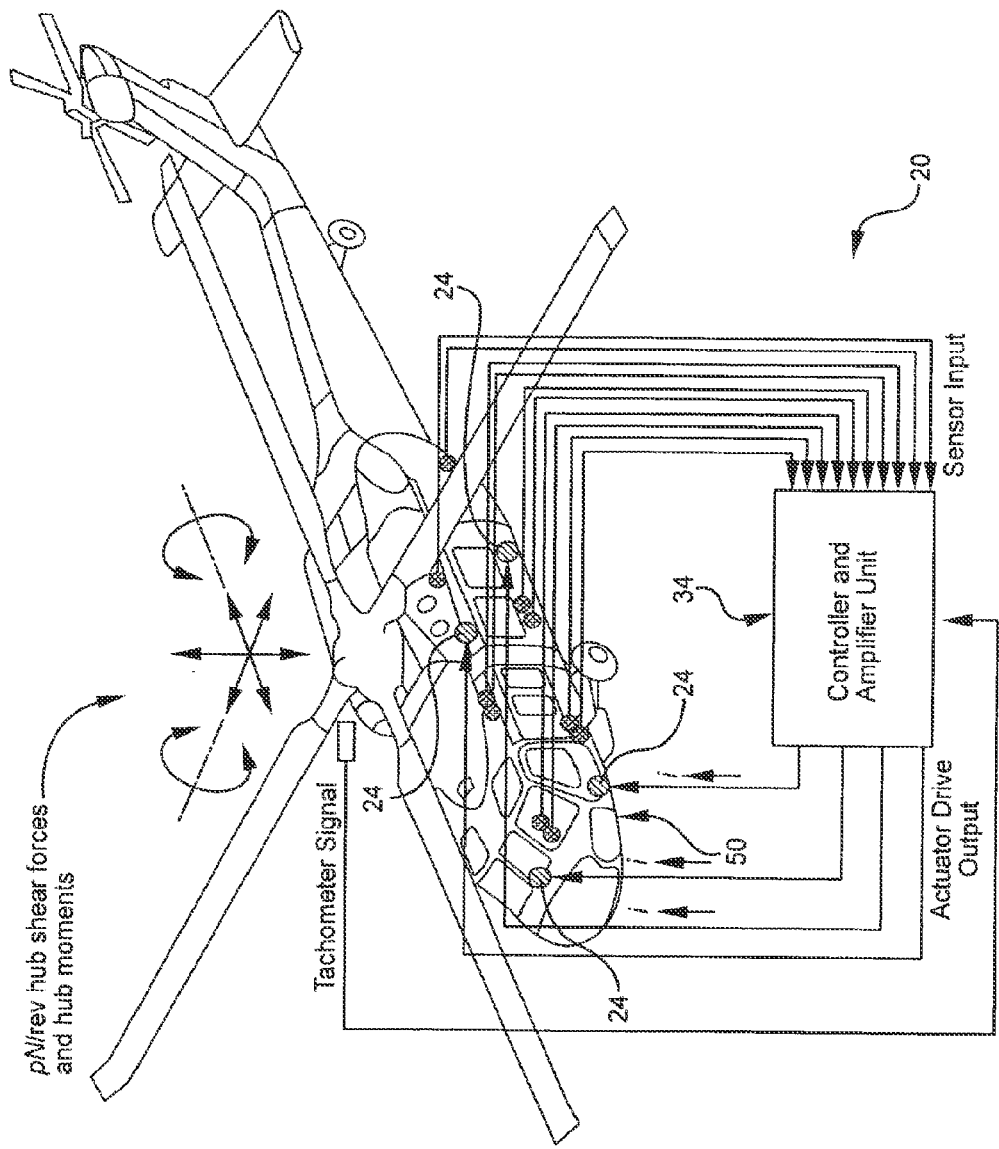
FIG. 5 shows methods and systems for controlling vibrations.

The invention includes a vibration canceling force generator for actively generating a vibration canceling force. The vibration canceling force generator includes a resonant actuator having a natural resonant frequency, and a resonant actuator electronic control system having a command input for receiving a command signal with the resonant actuator electronic control system providing an electrical drive current to the resonant actuator to drive the resonant actuator about the resonant frequency when commanded by a received command signal, and the resonant actuator has a feedback output with the feedback output fed back into the resonant actuator electronic control system wherein the resonant actuator electronic control system adjusts the electrical drive current based on the resonant actuator feedback output to generate the vibration canceling force. As shown in FIG. 1-5 the vibration canceling force generator 20 actively generates a vibration canceling force 22 which destructively interferes with and cancels an unwanted vibration force in a structure 50 that it is attached to. The vibration canceling force generator 20 preferably includes a linear voice coil resonant actuator 24 having a natural resonant frequency 46. Preferably the resonant actuator 24 is an electromagnetically driven sprung mass 26 suspended on resilient metal flexures 32. As shown in FIG. 2A-D, the EM (ElectroMagnetic) driven mass 26 is preferably suspended on a horizontal beam stack of multiple layers of resilient metal flexures 32, which are preferably supported by two vertical side resilient metal flexures post plates, to provide a sprung mass that can be electromagnetically driven to oscillate at its natural resonant frequency. Preferably the resonant actuator sprung mass is driven by modulating an electromagnetic field so the sprung mass is attracted and repelled by the EM field at its resonant frequency. Preferably the resonant actuator sprung mass includes a permanent magnet 28 in alignment with an electromagnetic coil 30, wherein a electrical drive current supplied to the EM coil 30 drives the sprung mass at resonance. The vibration canceling force generator 20 includes a resonant actuator electronic control system 34. Preferably the resonant actuator electronic control system 34 has a command input 36 for receiving a command signal 38 and the resonant actuator electronic control system includes a power amplifier 40 that produces the electrical drive current (i). The resonant actuator electronic control system 34 provides an electrical drive current 42 to the resonant actuator 24 to drive the resonant actuator about the resonant frequency when commanded by a received command signal 38, with the resonant actuator having a feedback output 44 fed back into the resonant actuator electronic control system wherein the resonant actuator electronic control system adjusts the electrical drive current (i) based on the resonant actuator feedback output 44 to generate the vibration canceling force 22. Preferably the resonant actuator 24 has a resonant actuator natural resonant frequency in a range of 15 to 40 Hz, more preferably in the range of 15-30 Hz, and most preferably in the range of 18 to 26 Hz. The vibration canceling force generator 20 is able to adapt to an aging of the resonant actuator 24 that alters the resonant actuator natural resonant frequency changes over an extended operation life time frame such as from the aging of the metal flexures and loosening of the metal flexure fasteners and fixtures over time, preferably with the utilization of the resonant actuator feedback output 44 to adjust the drive current to the resonant actuators aging natural resonant frequency so that the control system produced drive current can follow an aging change in the natural frequency over an extended period of time. Preferably the resonant actuator 24 has a damping level less than four percent of critical damping, more preferably a damping level less than two percent of critical damping. Preferably the resonant actuator 24 is a lightly damped resonant actuator. Preferably the resonant actuator 24 is a lightly damped resonant actuator with an effective damping ratio less than 0.5 (preferably with damping ratio=particular damping coefficient c/critical damping coefficient $c_r$). The vibration canceling force generator 20 utilizes a resonant actuator 24 that has a lightly damped mass spring system highly resonant response, with the actuator driven at resonance because of its highly resonant response. Preferably the command signal 38 is an analog input voltage, which is received by command input 36 with the variable voltage input command signal commanding the electronic control system 34 to produce a force 22 to cancel the unwanted vibration force in the vibrating structure 50. As shown in FIG. 4, preferably the vibration canceling force generator includes electrical connector interfaces 52 for disengagably connecting the resonant actuator 24 to the resonant actuator electronic control system 34. Such an electrical connector interface preferably includes a feedback loop connector 52 and an electrical drive current connector 52, with the connector interfaces 52 providing for interchanging of actuators 24 with the control systems 34 and the replacement and swapping of resonant actuators 24. Preferably the resonant actuator feedback output 44 is an electrical output from the resonant actuator back into the control system 34. In a preferred embodiment the actuator electrical output is directly fed from the actuator electrical output into the control system. In a preferred embodiment such as shown in FIG. 1, no separate physical actuator motion sensor for producing the feedback output is utilized, with the electrical feedback output 44 coming directly from the actuator and control system drive current. Preferably the resonant actuator electrical feedback output 44 is an electrical charge flow rate (i) through the resonant actuator, with the current (i_act) through the actuator fed back into the control system, with the actuator drive current (i) controlled and limited to a maximum operation value. Preferably the control system uses the current (i_act) feedback 44 in controlling the drive current (i) to drive the actuator at resonance and without the need of shape filtering. In an embodiment the resonant actuator feedback output 44 is an electrical potential difference through the resonant actuator 24, with the voltage (v_act) across the actuator fed back into the control system, with the voltage in the actuator controlled and limited to a maximum value corresponding to the rated voltage for the actuator for maximum operation displacement of the actuator at resonance. In an embodiment the resonant actuator feedback output 44 is the electrical charge flow rate (i_act) through the resonant actuator and the electrical potential difference (v_act) through the resonant actuator, with both the voltage and current fed back from actuator 24.

The invention comprises a method of making a vibration canceling force generator. The method includes providing a resonant actuator having a natural resonant frequency, providing a resonant actuator electronic control system having a power amplifier for providing an electrical drive current to drive the resonant actuator, and connecting the resonant actuator with the resonant actuator electronic control system wherein the resonant actuator electronic control system electrical drive current drives the resonant actuator about the natural resonant frequency when commanded by a received command signal, with the resonant actuator feeding an electrical output back into the resonant actuator electronic control system wherein the resonant actuator electronic control system adjusts the electrical drive current based on the resonant actuator electrical output.

The invention includes a method of making a vibration canceling force generator 20. The method includes providing a resonant actuator 24 having a natural resonant frequency, providing a resonant actuator electronic control system 34 having a command input for receiving a command signal and a power amplifier for providing an electrical drive current (i) to drive the resonant actuator, and connecting the resonant actuator with the resonant actuator electronic control system wherein the resonant actuator electronic control system electrical drive current (i) drives the resonant actuator about the natural resonant frequency when commanded by a received command signal, with the resonant actuator feeding an electrical output 44 back into the resonant actuator electronic control system wherein the resonant actuator electronic control system adjusts the electrical drive current (i) based on the resonant actuator electrical output 44. Providing resonant actuator 24 preferably includes providing an electromagnetically driven voice coil, preferably a sprung mass 26 driven by modulating a electromagnetic field produced by an EM coil 30 so the sprung mass is attracted and repelled by the EM field and the actuator resonates at its natural resonant frequency. Providing the resonant actuator electronic control system 34 preferably includes providing a resonant actuator electronic control system having a command input 36 for receiving a command signal 38 and a power amplifier 40 for providing an electrical drive current (i) to drive the resonant actuator about its resonant frequency. Preferably the command signal 38 is an analog input voltage, with the analog variable voltage input command signal commanding the control system to produce a vibration canceling force 22 which destructively interferes with and cancels an unwanted vibration force in the structure 50 that the actuator 24 is attached to. In a preferred embodiment such as shown in FIG. 1, the actuator electrical output 44 is fed back directly into the control system, preferably with no separate physical actuator motion sensor needed for producing the feedback output. In an alternative embodiment, such as shown in FIG. 4, the resonant actuator electrical output 44 includes an actuator sensor electrical output from an actuator sensor 54. The actuator sensor 54 provides an actuator sensor electrical output 44 relative to a physical motion characteristic of the actuator 24, such as a motion sensor measuring the motion of the moving mass 26. In an embodiment the actuator sensor 54 is an accelerometer mounted on the actuator driven sprung mass. In an embodiment the actuator sensor 54 is a velocity sensor measuring and sensing the velocity of the actuator driven sprung mass. In an embodiment the actuator sensor 54 is a displacement sensor measuring and sensing the displacement and position of the actuator driven sprung mass. Providing the resonant actuator 24, preferably includes providing a resonant actuator with a natural resonant frequency in the range of 15 to 40 Hz, more preferably 15-30 Hz, and most preferably 18 to 26 Hz. Providing the resonant actuator 24, preferably includes providing a resonant actuator which has a damping level less than four percent of critical damping, more preferably less than two percent of critical damping. Preferably the actuator 24 is a lightly damped resonant actuator with an effective damping ratio less than 0.5 (damping ratio=particular damping coefficient c/critical damping coefficient $c_r$). Preferably the actuator 24 has the highly resonant response of a lightly damped mass spring system. In an embodiment the method includes providing an electrical connector interface 52 for disengagably connecting the resonant actuator 24 to the resonant actuator electronic control system 34, preferably including a feedback output loop connectors 52, and electrical drive current connectors 52, with the disengagement and engagement of the connector interfaces used to interchange of actuators 24 with the control system 34, and for replacing and swapping out actuators 24 driven by the control system 34. Feeding back the electrical feedback 44 preferably includes feeding back the electrical charge flow rate through the resonant actuator. The current (i) through the actuator 24 is fed back into the control system as (i_act) with the drive current controlled and limited to a maximum operation value, most preferably with no shape filtering used to drive the actuator 24. In an embodiment of the invention feeding back the electrical feedback 44 preferably includes feeding back the electrical potential difference through the resonant actuator. The voltage across the actuator fed back into the control system as (v_act), with the voltage is controlled and limited to a maximum value corresponding to the rated voltage for the actuator 24 for maximum operation displacement of the actuator at resonance. In an embodiment feeding back the electrical feedback 44 preferably includes feeding back both the electrical charge flow rate through the resonant actuator and the electrical potential difference through the resonant actuator, with both the voltage and current feedback from actuator.

The invention comprises a method of controlling vibrations. The method includes providing a resonant actuator having a natural resonant frequency, providing a resonant actuator electronic control system for providing an electrical drive current to drive the resonant actuator, connecting the resonant actuator with the resonant actuator electronic control system, and driving the resonant actuator about the natural resonant frequency with the resonant actuator feeding an electrical output back into the resonant actuator electronic control system and adjusting the electrical drive current based on the resonant actuator electrical output.

The invention includes a method of controlling vibrations. The method includes providing a voice coil resonant actuator 24 having a natural resonant frequency, preferably an electromagnetically driven sprung mass driven by modulating a electromagnetic field so the sprung mass is attracted and repelled by the EM field. The method includes providing a resonant actuator electronic control system 34 for providing an electrical drive current to drive the resonant actuator and connecting the resonant actuator with the resonant actuator electronic control system. The method includes driving the resonant actuator about the natural resonant frequency with the resonant actuator feeding an electrical output back into the resonant actuator electronic control system and adjusting the electrical drive current based on the resonant actuator electrical output. Preferably providing a resonant actuator 24 includes providing a resonant actuator with a natural resonant frequency in a range of 15 to 40 Hz, more preferably 15-30 Hz, and most preferably 18 to 26 Hz. Preferably providing a resonant actuator 24 includes providing a resonant actuator with a damping level less than four percent of critical damping, more preferably less than two percent of critical damping. Preferably the lightly damped resonant actuator 24 has an effective damping ratio less than 0.5 (damping ratio=particular damping coefficient c/critical damping coefficient $c_r$), with the actuator having the highly resonant response of a lightly damped mass spring system. Preferably the method includes providing an electrical connector interface 52 for disengagably connecting the resonant actuator to the resonant actuator electronic control system. Preferably the resonant actuator electrical output 44 is an electrical potential difference through the resonant actuator with the voltage across the actuator fed back into the control system, with voltage controlled/limited to a maximum value corresponding to the rated voltage for the actuator for maximum operation displacement of the actuator at resonance. Preferably the resonant actuator electrical output 44 is an electrical charge flow rate through the resonant actuator. Preferably the resonant actuator electrical output is an electrical charge flow rate through the resonant actuator and an electrical potential difference through the resonant actuator. In an embodiment the resonant actuator electrical output is an actuator sensor electrical output.

The invention includes a vehicle vibration canceling system. The vehicle vibration canceling system includes a resonant actuator having a natural resonant frequency. The vehicle vibration canceling system includes a resonant actuator electronic controller for providing an electrical drive current to the resonant actuator to drive the resonant actuator about the resonant frequency. The resonant actuator has a feedback electrical output with the feedback electrical output fed back into the resonant actuator electronic controller wherein said resonant actuator electronic controller adjusts said electrical drive current based on said resonant actuator feedback electrical output.

The invention includes a vehicle vibration canceling system. The aircraft vehicle vibration canceling system includes a resonant actuator 24 having a natural resonant frequency, and a resonant actuator electronic controller 34, with the resonant actuator electronic controller providing an electrical drive current to the resonant actuator to drive the resonant actuator about the resonant frequency, with the resonant actuator having a feedback electrical output, the feedback electrical output fed back into the resonant actuator electronic controller wherein the resonant actuator electronic controller adjusts the electrical drive current based on the resonant actuator feedback electrical output to produce a vibration canceling for 22 to cancel a vibration in the vehicle vibrating structure 50 to which it is attached. Preferably the resonant actuator 24 is an electromagnetically driven sprung mass 26 suspended on resilient metal flexures 32. As shown in FIG. 2A-D, the EM driven mass 26 is preferably suspended on a horizontal beam stack of multiple layers of resilient metal flexures 32, which are preferably supported by two vertical side resilient metal flexures post plates, to provide a sprung mass that can be electromagnetically driven to oscillate at its natural resonant frequency. Preferably the resonant actuator sprung mass is driven by modulating an electromagnetic field so the sprung mass is attracted and repelled by the EM field at its resonant frequency. Preferably the resonant actuator sprung mass includes a permanent magnet 28 in alignment with an electromagnetic coil 30, wherein a electrical drive current supplied to the EM coil 30 drives the sprung mass at resonance. The vibration canceling force generator 20 includes a resonant actuator electronic control system 34. Preferably the resonant actuator electronic control system 34 has a command input 36 for receiving a command signal 38 and the resonant actuator electronic control system includes a power amplifier 40 that produces the electrical drive current (i). The resonant actuator electronic control system 34 provides an electrical drive current 42 to the resonant actuator 24 to drive the resonant actuator about the resonant frequency when commanded by a received command signal 38, with the resonant actuator having a feedback output 44 fed back into the resonant actuator electronic control system wherein the resonant actuator electronic control system adjusts the electrical drive current (i) based on the resonant actuator feedback output 44 to generate the vibration canceling force 22. Preferably the resonant actuator 24 has a resonant actuator natural resonant frequency in a range of 15 to 40 Hz, more preferably in the range of 15-30 Hz, and most preferably in the range of 18 to 26 Hz. The vibration canceling force generator 20 is able to adapt to an aging of the resonant actuator 24 that alters the resonant actuator natural resonant frequency changes over an extended operation life time frame such as from the aging of the metal flexures and loosening of the metal flexure fasteners and fixtures over time, preferably with the utilization of the resonant actuator feedback output 44 to adjust the drive current to the resonant actuators aging natural resonant frequency so that the control system produced drive current can follow an aging change in the natural frequency over an extended period of time. Preferably the resonant actuator 24 has a damping level less than four percent of critical damping, more preferably a damping level less than two percent of critical damping. Preferably the resonant actuator 24 is a lightly damped resonant actuator. Preferably the resonant actuator 24 is a lightly damped resonant actuator with an effective damping ratio less than 0.5 (preferably with damping ratio=particular damping coefficient c/critical damping coefficient $c_r$). The vibration canceling force generator 20 utilizes a resonant actuator 24 that has a lightly damped mass spring system highly resonant response, with the actuator driven at resonance because of its highly resonant response. Preferably the command signal 38 is an analog input voltage, which is received by command input 36 with the variable voltage input command signal commanding the electronic control system 34 to produce a force 22 to cancel the unwanted vibration force in the vibrating structure 50. As shown in FIG. 4, preferably the vibration canceling force generator includes electrical connector interfaces 52 for disengagably connecting the resonant actuator 24 to the resonant actuator electronic control system 34. Such an electrical connector interface preferably includes a feedback loop connector 52 and an electrical drive current connector 52, with the connector interfaces 52 providing for interchanging of actuators 24 with the control systems 34 and the replacement and swapping of resonant actuators 24. Preferably the resonant actuator feedback output 44 is an electrical output from the resonant actuator back into the control system 34. In a preferred embodiment the actuator electrical output is directly fed from the actuator electrical output into the control system. In a preferred embodiment such as shown in FIG. 1, no separate physical actuator motion sensor for producing the feedback output is utilized, with the electrical feedback output 44 coming directly from the actuator and control system drive current. Preferably the resonant actuator electrical feedback output 44 is an electrical charge flow rate (i) through the resonant actuator, with the current (i_act) through the actuator fed back into the control system, with the actuator drive current (i) controlled and limited to a maximum operation value. Preferably the control system uses the current (i_act) feedback 44 in controlling the drive current (i) to drive the actuator at resonance and without the need of shape filtering. In an embodiment the resonant actuator feedback output 44 is an electrical potential difference through the resonant actuator 24, with the voltage (v_act) across the actuator fed back into the control system, with the voltage in the actuator controlled and limited to a maximum value corresponding to the rated voltage for the actuator for maximum operation displacement of the actuator at resonance. In an embodiment the resonant actuator feedback output 44 is the electrical charge flow rate (i_act) through the resonant actuator and the electrical potential difference (v_act) through the resonant actuator, with both the voltage and current fed back from actuator 24.

The invention includes a method of making a helicopter vibration canceling system. The method includes providing a resonant actuator having a natural resonant frequency. The method includes providing a resonant actuator electronic control system for providing an electrical drive current to drive said resonant actuator. The method includes connecting the resonant actuator with the resonant actuator electronic control system wherein the resonant actuator electronic control system electrical drive current drives the resonant actuator about the natural resonant frequency with said resonant actuator feeding an electrical output back into the resonant actuator electronic control system wherein the resonant actuator electronic control system adjusts the electrical drive current based on the resonant actuator electrical output.

The invention includes a method of making a helicopter vibration canceling system for canceling vibrations generated in a helicopter. The method includes providing a resonant actuator 24 having a natural resonant frequency, providing a resonant actuator electronic control system 34 for providing an electrical drive current to drive the resonant actuator, and connecting the resonant actuator with the resonant actuator electronic control system wherein the resonant actuator electronic control system electrical drive current drives the resonant actuator about the natural resonant frequency, with the resonant actuator feeding an electrical output 44 back into the resonant actuator electronic control system wherein the resonant actuator electronic control system adjusts the electrical drive current based on the resonant actuator electrical output. Providing resonant actuator 24 preferably includes providing an electromagnetically driven voice coil, preferably a sprung mass 26 driven by modulating a electromagnetic field produced by an EM coil 30 so the sprung mass is attracted and repelled by the EM field and the actuator resonates at its natural resonant frequency. Providing the resonant actuator electronic control system 34 preferably includes providing a resonant actuator electronic control system having a command input 36 for receiving a command signal 38 and a power amplifier 40 for providing an electrical drive current (i) to drive the resonant actuator about its resonant frequency. Preferably the command signal 38 is an analog input voltage, with the analog variable voltage input command signal commanding the control system to produce a vibration canceling force 22 which destructively interferes with and cancels an unwanted vibration force in the structure 50 that the actuator 24 is attached to. In a preferred embodiment such as shown in FIG. 1, the actuator electrical output 44 is fed back directly into the control system, preferably with no separate physical actuator motion sensor needed for producing the feedback output. In an alternative embodiment, such as shown in FIG. 4, the resonant actuator electrical output 44 includes an actuator sensor electrical output from an actuator sensor 54. The actuator sensor 54 provides an actuator sensor electrical output 44 relative to a physical motion characteristic of the actuator 24, such as a motion sensor measuring the motion of the moving mass 26. In an embodiment the actuator sensor 54 is an accelerometer mounted on the actuator driven sprung mass. In an embodiment the actuator sensor 54 is a velocity sensor measuring and sensing the velocity of the actuator driven sprung mass. In an embodiment the actuator sensor 54 is a displacement sensor measuring and sensing the displacement and position of the actuator driven sprung mass. Providing the resonant actuator 24, preferably includes providing a resonant actuator with a natural resonant frequency in the range of 15 to 40 Hz, more preferably 15-30 Hz, and most preferably 18 to 26 Hz. Providing the resonant actuator 24, preferably includes providing a resonant actuator which has a damping level less than four percent of critical damping, more preferably less than two percent of critical damping. Preferably the actuator 24 is a lightly damped resonant actuator with an effective damping ratio less than 0.5 (damping ratio=particular damping coefficient c/critical damping coefficient $c_r$). Preferably the actuator 24 has the highly resonant response of a lightly damped mass spring system. In an embodiment the method includes providing an electrical connector interface 52 for disengagably connecting the resonant actuator 24 to the resonant actuator electronic control system 34, preferably including a feedback output loop connectors 52, and electrical drive current connectors 52, with the disengagement and engagement of the connector interfaces used to interchange of actuators 24 with the control system 34, and for replacing and swapping out actuators 24 driven by the control system 34. Feeding back the electrical feedback 44 preferably includes feeding back the electrical charge flow rate through the resonant actuator. The current (i) through the actuator 24 is fed back into the control system as (i_act) with the drive current controlled and limited to a maximum operation value, most preferably with no shape filtering used to drive the actuator 24. In an embodiment of the invention feeding back the electrical feedback 44 preferably includes feeding back the electrical potential difference through the resonant actuator. The voltage across the actuator fed back into the control system as (v_act), with the voltage is controlled and limited to a maximum value corresponding to the rated voltage for the actuator 24 for maximum operation displacement of the actuator at resonance. In an embodiment feeding back the electrical feedback 44 preferably includes feeding back both the electrical charge flow rate through the resonant actuator and the electrical potential difference through the resonant actuator, with both the voltage and current feedback from actuator.

The invention includes a method of controlling helicopter vibrations. The method includes providing a resonant actuator having a natural resonant frequency. The method includes mounting the resonant actuator in a helicopter. The method includes providing a resonant actuator electronic control system for providing an electrical drive current to drive the resonant actuator. The method includes connecting the resonant actuator with the resonant actuator electronic control system. The method includes driving the resonant actuator about the natural resonant frequency with the resonant actuator feeding an electrical output back into the resonant actuator electronic control system and adjusting the electrical drive current based on the resonant actuator electrical output.

The invention includes a method of controlling helicopter vibrations. The method includes providing a resonant actuator 24 having a natural resonant frequency, mounting the resonant actuator in a helicopter to a vibrating structure 50 of the helicopter, providing a resonant actuator electronic control system 34 for providing an electrical drive current to drive the resonant actuator, connecting the resonant actuator with the resonant actuator electronic control system, and driving the resonant actuator about the natural resonant frequency with the resonant actuator feeding an electrical output back into the resonant actuator electronic control system and adjusting the electrical drive current based on the resonant actuator electrical output. The method includes driving the resonant actuator about the natural resonant frequency with the resonant actuator feeding an electrical output back into the resonant actuator electronic control system and adjusting the electrical drive current based on the resonant actuator electrical output. Preferably providing a resonant actuator 24 includes providing a resonant actuator with a natural resonant frequency in a range of 15 to 40 Hz, more preferably 15-30 Hz, and most preferably 18 to 26 Hz. Preferably providing a resonant actuator 24 includes providing a resonant actuator with a damping level less than four percent of critical damping, more preferably less than two percent of critical damping. Preferably the lightly damped resonant actuator 24 has an effective damping ratio less than 0.5 (damping ratio=particular damping coefficient c/critical damping coefficient $c_r$), with the actuator having the highly resonant response of a lightly damped mass spring system. Preferably the method includes providing an electrical connector interface 52 for disengagably connecting the resonant actuator to the resonant actuator electronic control system. Preferably the resonant actuator electrical output 44 is an electrical potential difference through the resonant actuator with the voltage across the actuator fed back into the control system, with voltage controlled/limited to a maximum value corresponding to the rated voltage for the actuator for maximum operation displacement of the actuator at resonance. Preferably the resonant actuator electrical output 44 is an electrical charge flow rate through the resonant actuator. Preferably the resonant actuator electrical output is an electrical charge flow rate through the resonant actuator and an electrical potential difference through the resonant actuator. In an embodiment the resonant actuator electrical output is an actuator sensor electrical output.

The invention utilizes tuning of the current loop of the amplifier to provide force shaping without using a shaping filter, with such tuning limiting the maximum current and power delivered to the actuator at frequencies away from resonance and, keeps the moving mass displacements below fatigue limits at resonance. The amplifier behaves like a voltage controlled amplifier close to the resonance frequency and a current controlled amplifier away from resonance. Since the actuator voltage is proportional to flexure displacement near resonance, limiting the actuator voltage near resonance protects the actuator from being overdriven. Preferably the magnitude of the trans-conductance dip of the amplifier is tuned to limit displacement at resonance and the pass-band gain of the amplifier in order to limit the current/power away from the resonance frequency. The invention allows the system to adapt to changes in the resonance frequency. With the invention no data is required from the installed actuators and no shaping filters are required in the system. With the invention the actuators can be changed, swapped, repaired, and/or replaced without making any changes and/or adjustments to the electronic control system.

Figure 6:
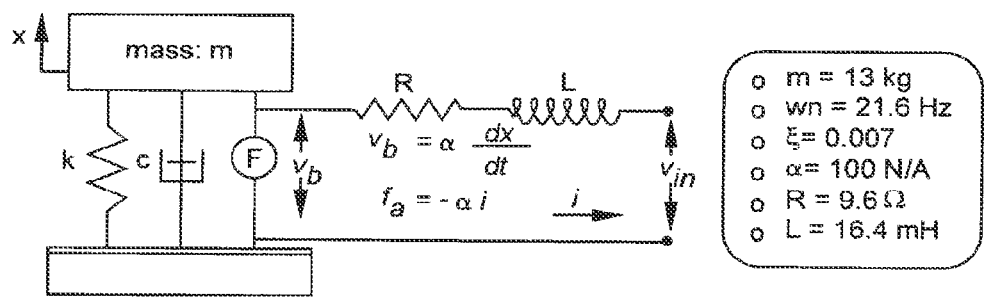
FIG. 6 shows methods and systems for controlling vibrations.

FIG. 6 shows a schematic of the vibration control actuator system. The actuator system can be modeled using the following equations:

$$m\frac{\partial^2 x}{\partial t^2} + c\frac{\partial x}{\partial t} = kx = F_a(t)$$

$$L\frac{di}{dt} + Ri + \alpha\frac{\partial x}{\partial t} = v_{in}$$

$$F_a(t) = -\alpha i$$

$$X = \frac{\left(\frac{\alpha}{Ls+R}\right)}{\left(ms^2 + cs + k\frac{\alpha^2 s}{Ls+R}\right)} V_{in}$$

$$I = \frac{1}{\left(Ls + R + \frac{\alpha^2 s}{ms^2 + cs + k}\right)} V_{in}$$

Figure 7:
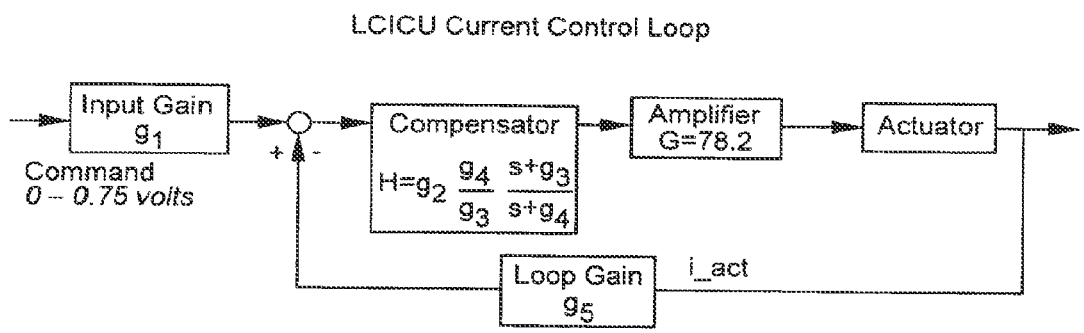
FIG. 7 shows methods and systems for controlling vibrations.
Figure 8:
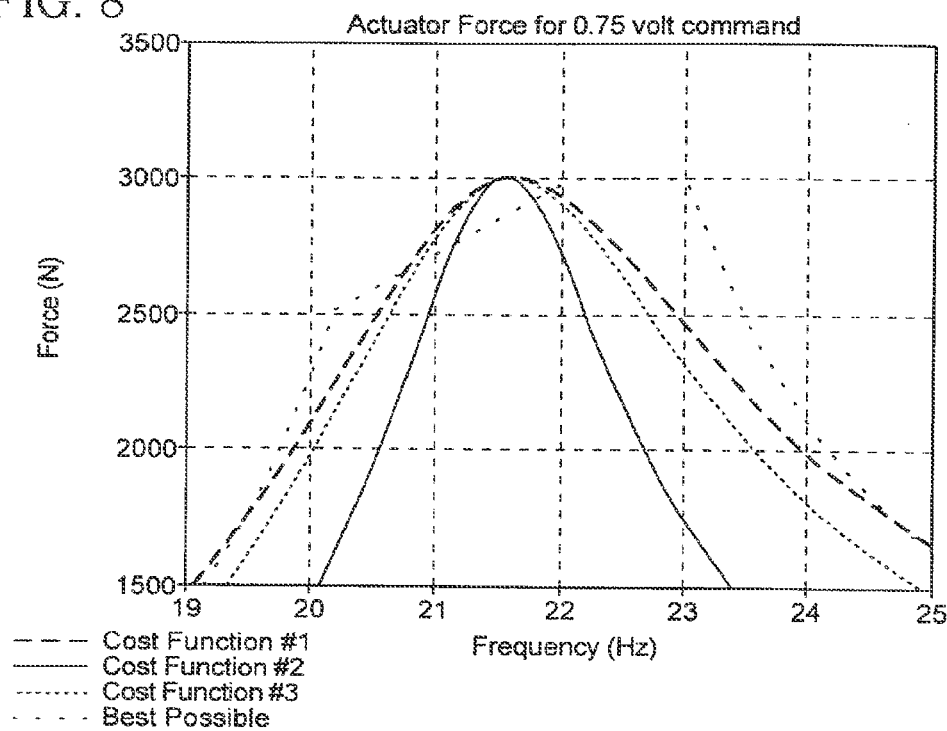
FIG. 8 is a plot of Force (N) y-axis and Frequency (Hz) x-axis (Actuator Force for 0.75 volt command).
Figure 9:
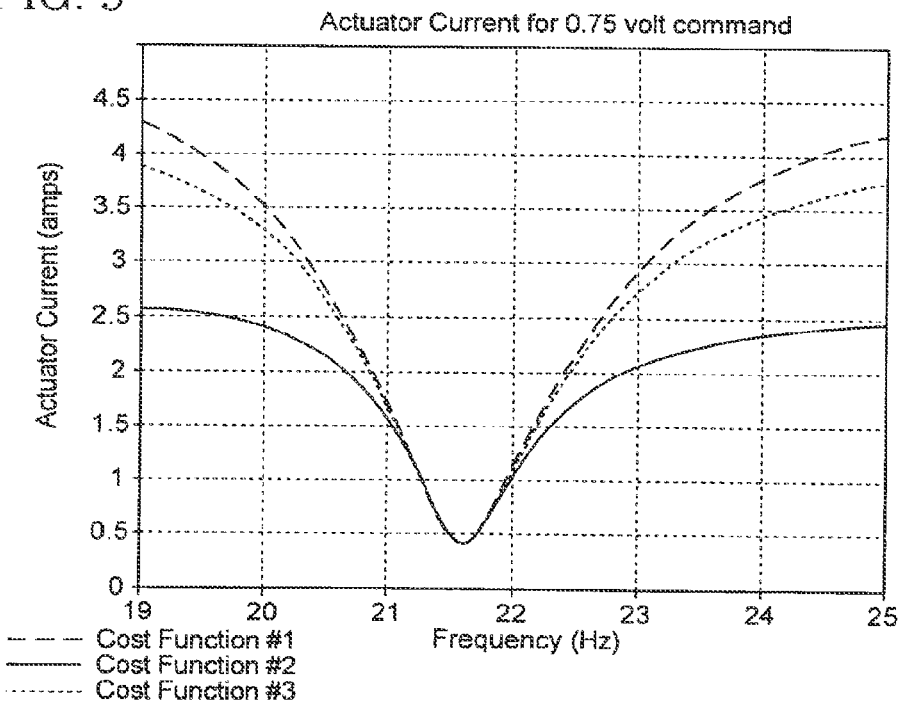
FIG. 9 is a plot of Actuator Current (amps) y-axis and Frequency (Hz) x-axis (Actuator Current for 0.75 volt command).
Figure 10:
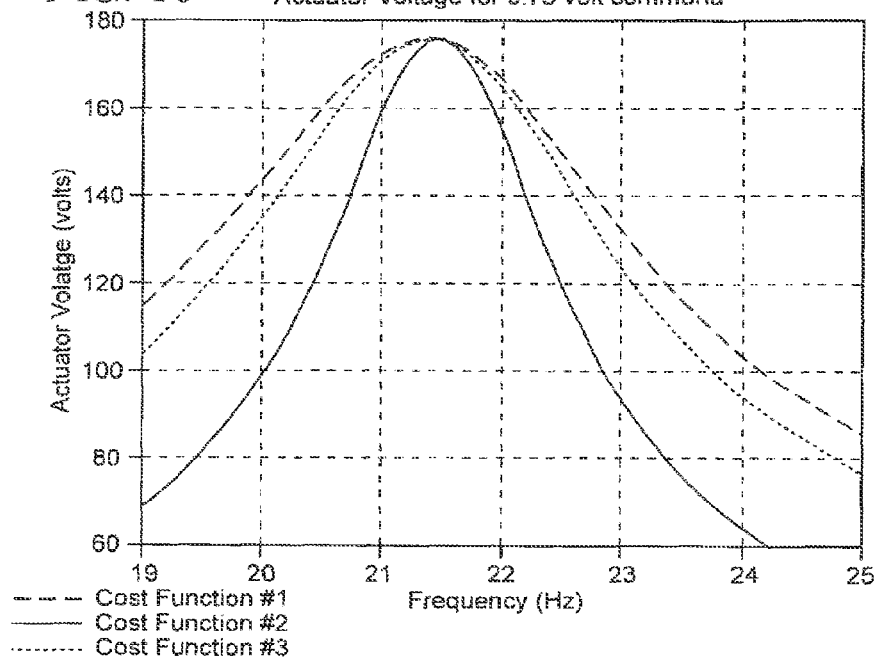
FIG. 10 is a plot of Actuator Voltage (volts) y-axis and Frequency (Hz) x-axis (Actuator Voltage for 0.75 volt command).
Figure 11:
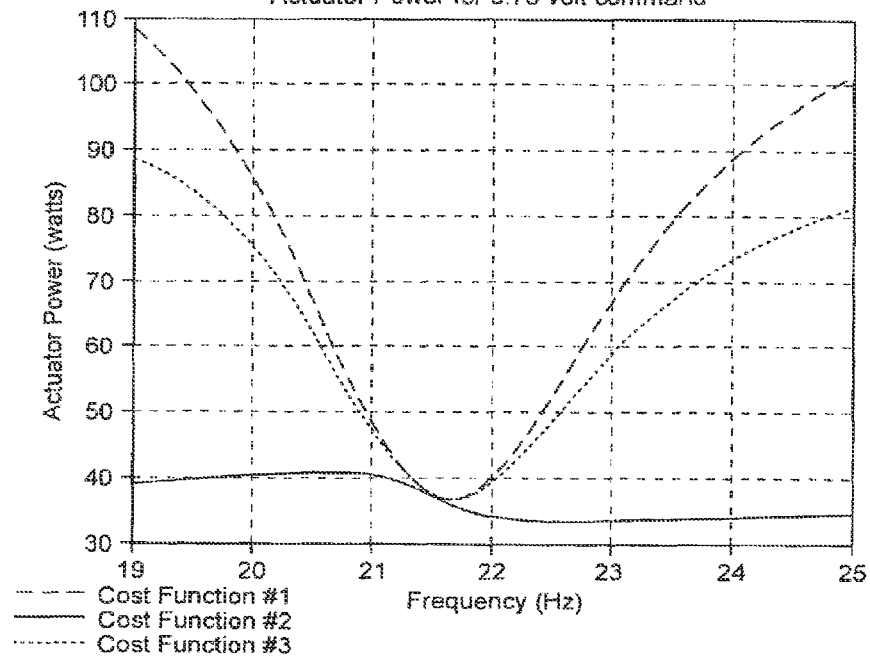
FIG. 11 is a plot of Actuator Power (watts) y-axis and Frequency (Hz) x-axis (Actuator Power for 0.75 volt command).
Figure 12:
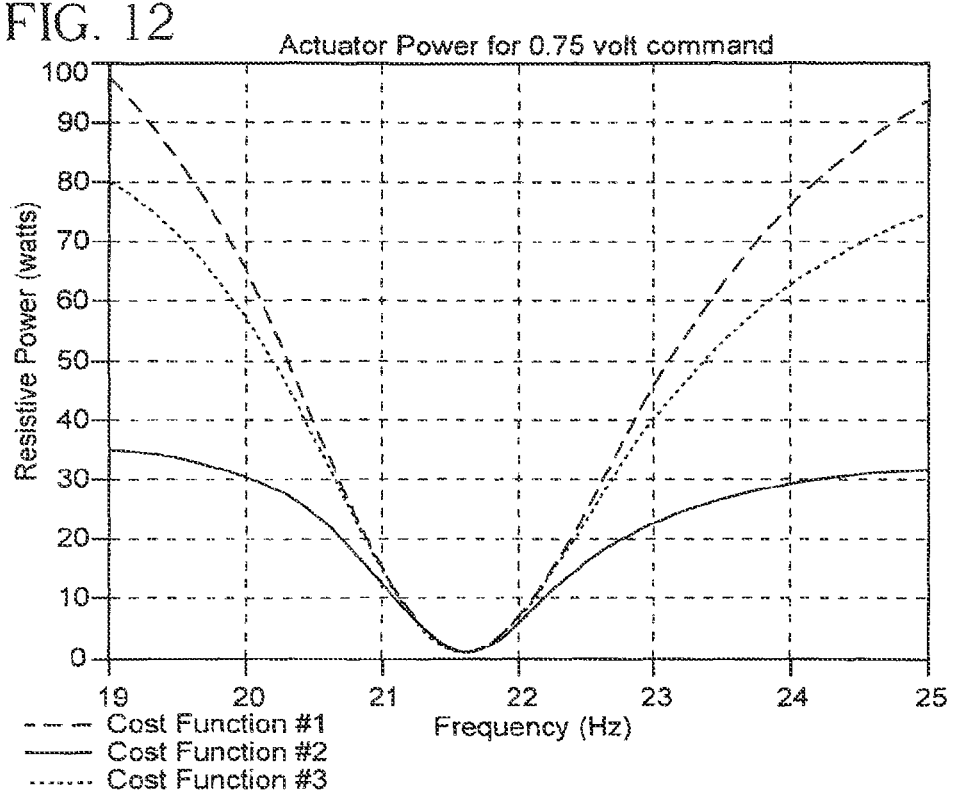
FIG. 12 is a plot of Resistive Power (watts) y-axis and Frequency (Hz) x-axis (Actuator Power for 0.75 volt command).
Figure 13:
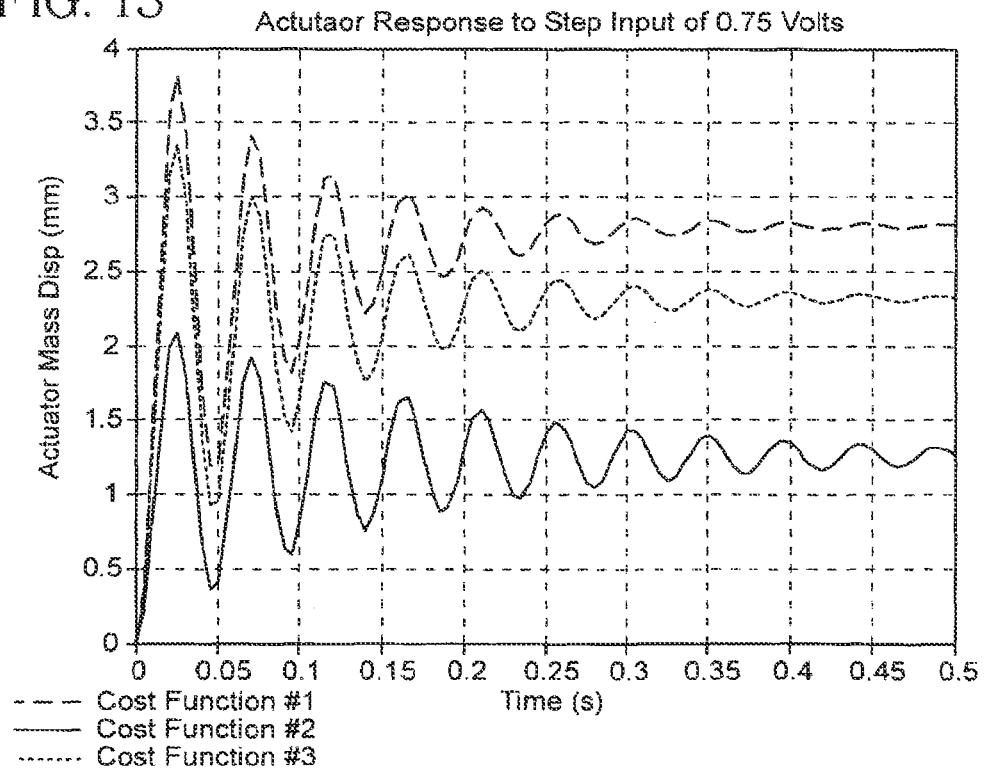
FIG. 13 is a plot of Actuator Mass Displacement (mm) y-axis and Time (s) x-axis (Actuator Response to Step Input of 0.75 Volts).
Figure 14:
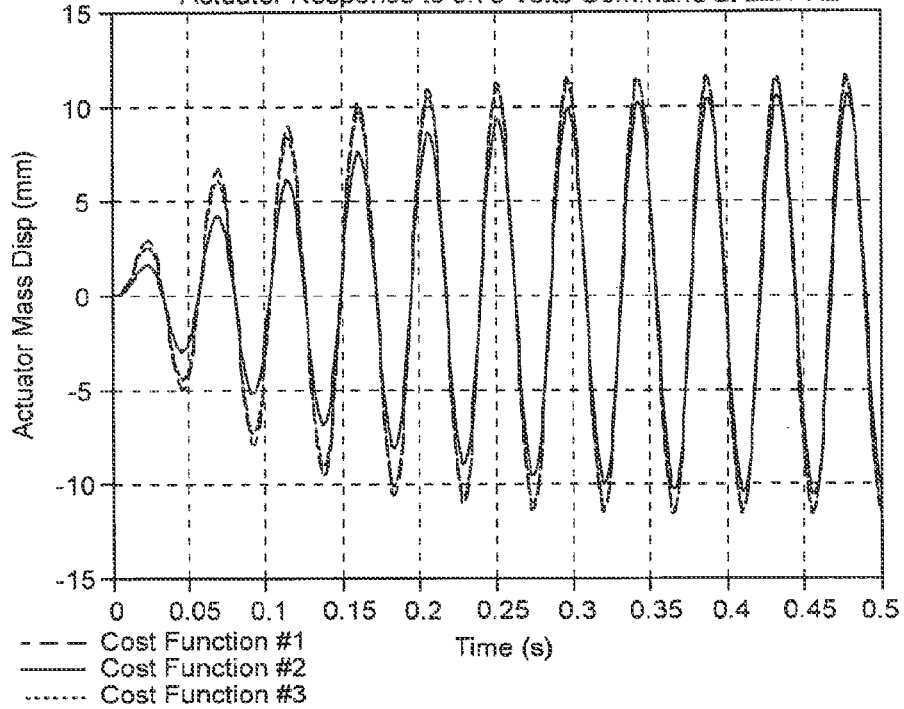
FIG. 14 is a plot of Actuator Mass Displacement (mm) y-axis and Time (s) x-axis (Actuator Response to 0.75 Volts Command at 22.1 Hz).
Figure 15:
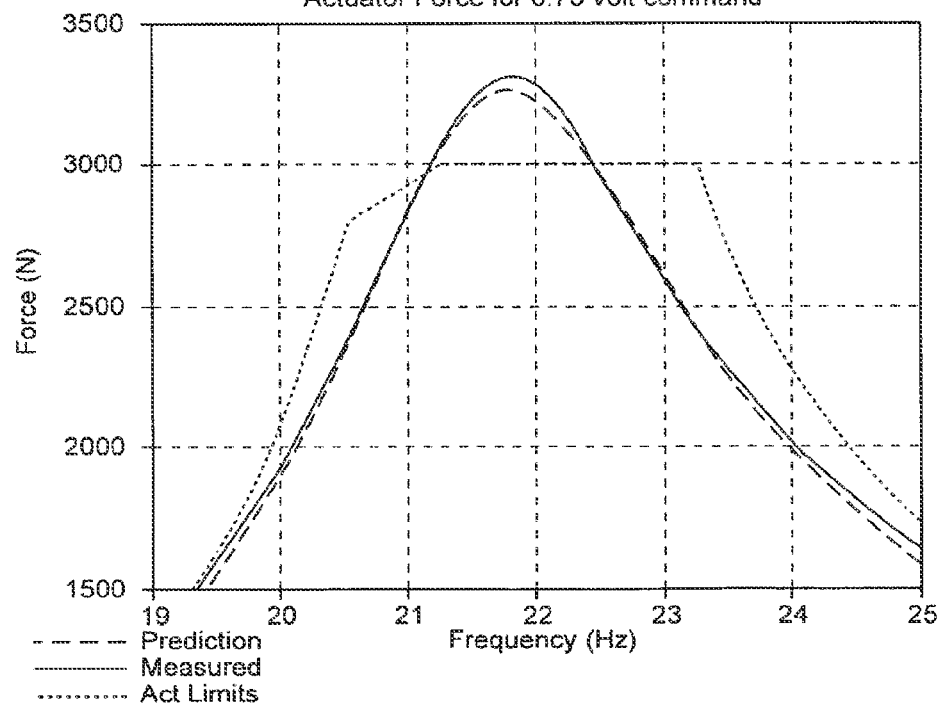
FIG. 15 is a plot of Force (N) y-axis and Frequency (Hz) x-axis (Actuator Force for 0.75 volt command).
Figure 16:
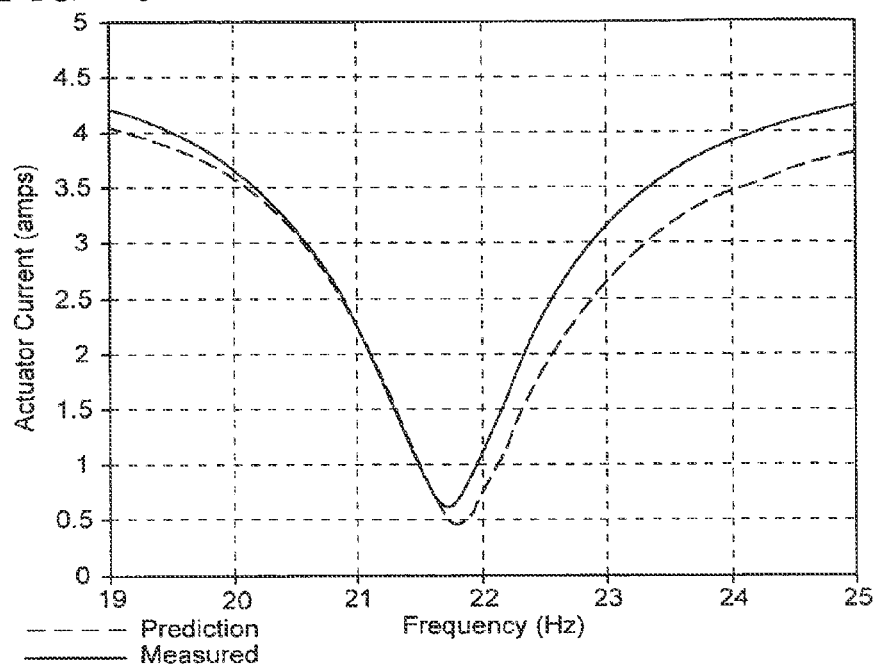
FIG. 16 is a plot of Actuator Current (amps) y-axis and Frequency (Hz) x-axis (Actuator Current for 0.75 volt command).
Figure 17:
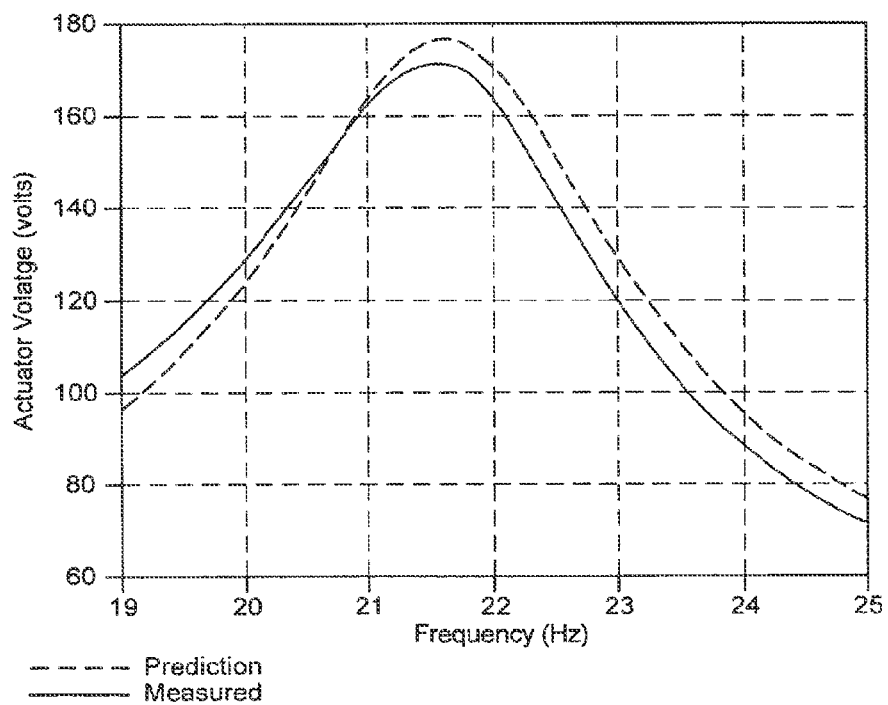
FIG. 17 is a plot of Actuator Voltage (volts) y-axis and Frequency (Hz) x-axis (Actuator Voltage for 0.75 volt command).

FIG. 7 shows the schematic of a current loop of the LUICU. The five gains ($g_1$ through $g_5$) shown in the schematic are preferably optimized to achieve a desired performance. Preferably with loop optimization, there are five parameters for optimization in the control scheme:

Input gain $g_1$
Compensator gains $g_2, g_3, g_4$
Feedback loop gain $g_5$
Preferably with loop optimization, there are two considerations:
 1) The system should not exceed the physical limits;
 2) The system should have sufficient stability margins.
Preferably these gains are designed through a coupled optimization study and a stability analysis, a number of cost functions can be used for optimization and they will result in different solutions, with examples and their comparison presented here:

$$\Phi 1 = \left(\frac{I(\omega_1) - I_{max}}{w1}\right)^2 + \left(\frac{F(\omega_n) - F_{req}}{w2}\right)^2$$

$$\Phi 2 = \left(\frac{I(\omega_1) - I_{max}}{w1}\right)^2 + \left(\frac{F(\omega_n) - F_{req}}{w2}\right)^2 + \left(\frac{P(\omega_n) - P_{max}}{w3}\right)$$

$$\Phi 3 = \left(\frac{I(\omega_1) - I_{max}}{w1}\right)^2 + \left(\frac{F(\omega_n) - F_{req}}{w2}\right)^2 + \left(\frac{P(\omega_n) - P_{max}}{w3}\right)^2$$

where $I_{max}$ and $P_{max}$ are the maximum allowed current and power respectively. The $F_{req}$ is the desired force.
For simplicity and demonstration purposes, two gains are optimized, $g_1$ and $g_5$, with the following values used:
 $I_{max}$=5 amps, $P_{max}$=100 watts and $F_{req}$=3000 N
 w1=300, w2=1 and w3=6
 $\Phi_1$=10 Hz, $\Phi_n$=21.6 Hz
The below table shows the optimized gains for the three cost functions. The system is optimized for 13 Kg moving mass

| Cost Function | $g_1$ | $g_5$ |
|---|---|---|
| $\Phi_1$ | 0.95555 | 0.10654 |
| $\Phi_1$ | 1.0396 | 0.2585 |
| $\Phi_1$ | 0.96887 | 0.13062 |

The plots of FIG. 8-17 show the performance of the method/system. In implementation and lab testing the loop changes were implemented in the LCICU amplifier card and the system was tested. For testing, the following values were used:
 g1=0.295, g2=50, g3=2*pi*2.4, g4=2*pi*354, g5=0.1245; the testing was done for an actuator mass of 14.2 and resonance of 21.72; the optimization was done for mass of 13; the test demonstrated that the system performance was within specs. It is noted that the mass estimation is important to limit the force, since we tuned the resonant acceleration and not the force.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents. It is intended that the scope of differing terms or phrases in the claims may be fulfilled by the same or different structure(s) or step(s).

The invention claimed is:

1. An aircraft vibration canceling force generator for actively generating an aircraft vibration canceling force, said aircraft vibration canceling force generator comprising:
 an aircraft resonant actuator, said resonant actuator including an electromagnetically driven sprung mass, said resonant actuator having an aging resonant frequency, and a resonant actuator electronic control system having an input for receiving a signal, said resonant actuator electronic control system providing an electrical drive current to said resonant actuator to drive said resonant actuator about said aging resonant frequency when commanded by a received signal, said resonant actuator having a direct feedback electrical output, said direct feedback electrical output directly fed back into said resonant actuator electronic control system wherein said resonant actuator electronic control system adjusts said electrical drive current based on said resonant actuator direct feedback electrical output to generate said aircraft vibration canceling force.

2. An aircraft vibration canceling force generator as claimed in claim 1 wherein said resonant actuator includes a stack of resilient flexures.

3. An aircraft vibration canceling force generator as claimed in claim 2 wherein said stack of resilient flexures is comprised of a beam stack of multiple layers of resilient flexures.

4. An aircraft vibration canceling force generator as claimed in claim 1 wherein said resonant actuator includes a plurality of flexures.

5. An aircraft vibration canceling force generator as claimed in claim 1 wherein said resonant actuator electromagnetically driven sprung mass is supported by a plurality of vertical side resilient flexure posts.

6. An aircraft vibration canceling force generator as claimed in claim 1 including an electrical connector interface for disengagably connecting said resonant actuator to said resonant actuator electronic control system.

7. An aircraft vibration canceling force generator as claimed in claim 1, wherein said resonant actuator direct feedback electrical output is an electrical potential difference through said resonant actuator.

8. An aircraft vibration canceling force generator as claimed in claim 1, wherein said resonant actuator direct feedback electrical output is an electrical charge flow rate through said resonant actuator.

9. An aircraft vibration canceling force generator as claimed in claim 1, wherein said resonant actuator direct feedback electrical output is an electrical charge flow rate through said resonant actuator and an electrical potential difference through said resonant actuator.

10. An aircraft vibration canceling force generator as claimed in claim 1, wherein said resonant actuator does not include a separate physical actuator motion sensor.

11. A method of making an aircraft vibration canceling force generator, said method comprising the steps of: providing an aircraft resonant actuator having an aging resonant frequency and an electrical output, said aging resonant frequency changing over time, providing a resonant actuator electronic control system having an input for receiving a signal, said electronic control system providing an electrical drive current to drive said resonant actuator, connecting said resonant actuator with said resonant actuator electronic control system wherein said resonant actuator electronic control system electrical drive current drives said resonant actuator about said aging resonant frequency when commanded by a received signal, with said resonant actuator feeding said electrical output back into said resonant actuator electronic control system wherein said resonant actuator electronic control system adjusts said electrical drive current based on said resonant actuator electrical output.

12. A method as claimed in claim 11 wherein providing a resonant actuator includes providing a resonant actuator with an electromagnetically driven sprung mass.

13. A method as claimed in claim 12 wherein said resonant actuator electromagnetically driven sprung mass is suspended with a plurality of resilient flexures.

14. A method as claimed in claim 11 wherein said method includes providing an electrical connector interface for disengagably connecting said resonant actuator to said resonant actuator electronic control system.

15. A method as claimed in claim 11, wherein said resonant actuator electrical output is an electrical potential difference through said resonant actuator.

16. A method as claimed in claim 11, wherein said resonant actuator electrical output is an electrical charge flow rate through said resonant actuator.

17. A method as claimed in claim 11, wherein said resonant actuator electrical output is an electrical charge flow rate through said resonant actuator and an electrical potential difference through said resonant actuator.

18. A method as claimed in claim 11 wherein providing a resonant actuator includes providing a resonant actuator said resonant actuator that does not include a separate physical actuator motion sensor.

19. A method of controlling aircraft vibrations, said method comprising the steps of: providing a resonant actuator, said resonant actuator including an electromagnetically driven sprung mass, said resonant actuator having an electrical output, said resonant actuator having a resonant frequency, said resonant frequency changing over time, providing an electronic control system for providing an electrical drive current to drive said resonant actuator, connecting said resonant actuator with said electronic control system, electromagnetically driving said resonant actuator about said resonant frequency with said resonant actuator feeding said electrical output back into said electronic control system and adjusting said electrical drive current based on said resonant actuator electrical output.

20. A method as claimed in claim 19 wherein said resonant actuator electromagnetically driven sprung mass is suspended with a plurality of resilient flexures.

21. A method as claimed in claim 19 wherein said method includes providing an electrical connector interface for disengagably connecting said resonant actuator to said electronic control system.

22. A method as claimed in claim 19, wherein said resonant actuator electrical output is an electrical potential difference through said resonant actuator.

23. A method as claimed in claim 19, wherein said resonant actuator electrical output is an electrical charge flow rate through said resonant actuator.

24. A method as claimed in claim 19, wherein said resonant actuator electrical output is an electrical charge flow rate through said resonant actuator and an electrical potential difference through said resonant actuator.

25. A method as claimed in claim 19, wherein said resonant actuator electrical output is not from a separate physical actuator motion sensor.

26. A method as claimed in claim 19, wherein said electronic control system includes an amplifier with a current loop, and the method includes controlling said amplifier as a voltage controlled amplifier proximate said resonant frequency and controlling said amplifier as a current controlled amplifier away from said resonant frequency.

27. A helicopter, said helicopter having helicopter vibrations, said helicopter including a helicopter vibration canceling system, said vibration canceling system comprising at least one resonant actuator, said resonant actuator including an electromagnetically driven sprung mass, said resonant actuator having a resonant frequency, said resonant frequency changing over time, and a resonant actuator electronic controller, said resonant actuator electronic controller providing an electrical drive current to said resonant actuator to electromagnetically drive said resonant actuator about said resonant frequency, said resonant actuator having a feedback electrical output, said feedback electrical output fed back into said resonant actuator electronic controller wherein said resonant actuator electronic controller adjusts said electrical drive current based on said resonant actuator feedback electrical output with said helicopter vibration canceling system controlling said helicopter vibrations.

28. A helicopter as claimed in claim 27 wherein said resonant actuator includes a plurality of resilient flexures.

29. A helicopter as claimed in claim 27 including an electrical connector interface for disengagably connecting said resonant actuator to said resonant actuator electronic control system.

30. A helicopter as claimed in claim 27 wherein said resonant actuator feedback electrical output is an electrical potential difference through said resonant actuator.

31. A helicopter as claimed in claim 27 wherein said resonant actuator feedback electrical output is an electrical charge flow rate through said resonant actuator.

32. A helicopter as claimed in claim 27 wherein said resonant actuator feedback electrical output is an electrical charge flow rate through said resonant actuator and an electrical potential difference through said resonant actuator.

33. A helicopter as claimed in claim 27 wherein said resonant actuator does not include a separate physical actuator motion sensor.

* * * * *